June 26, 1956 V. SANTARELLI 2,752,200
SPRAYER
Filed April 19, 1955
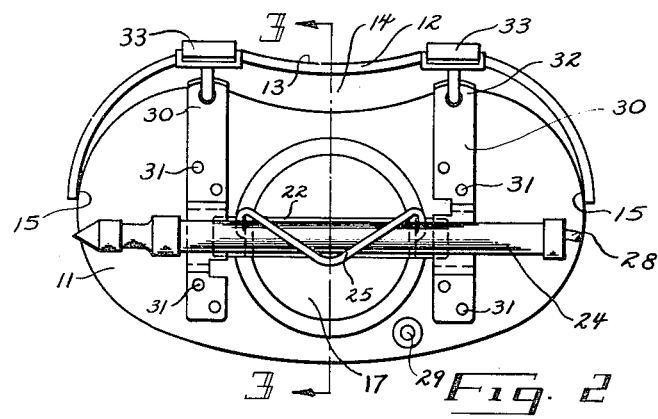
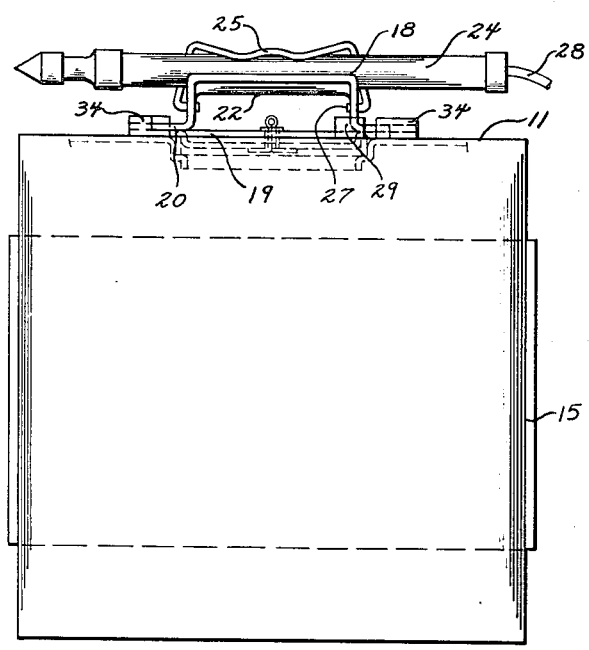
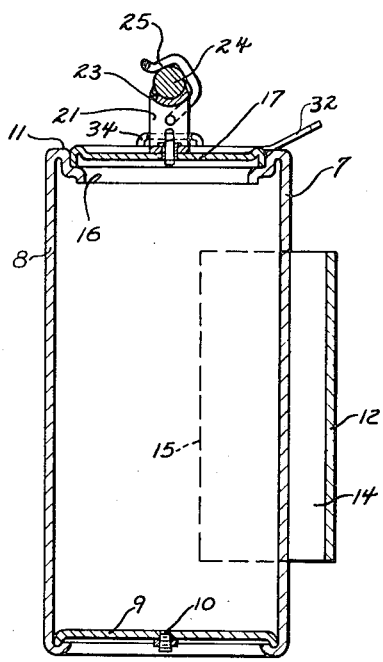
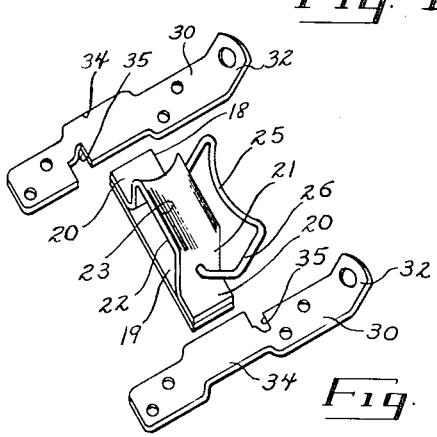
INVENTOR.
VINCENT SANTARELLI United States Patent Office 2,752,200
Patented June 26, 1956

2,752,200

SPRAYER

Vincent Santarelli, Detroit, Mich.

Application April 19, 1955, Serial No. 502,490

5 Claims. (Cl. 299—101)

This invention relates to an improved portable garden sprayer of the type adapted to be carried on the back of the operator for spraying liquid insecticide onto plants.

It is an important object of this invention to provide a portable garden sprayer, including a back rest shaped to conform with the back of the operator and which is suitably secured to the sprayer container, yet which is spaced therefrom, to protect the operator from the cool liquids normally carried in the sprayer container.

It is another object of this invention to provide a portable garden sprayer including a container having a fill opening in the upper end thereof, a cover for said fill opening, a handle fixedly mounted on said cover, a means for releasably locking said handle in place on said container, and a means for detachably holding the sprayer nozzle on the handle when the nozzle is not in use.

It is a further object of this invention to provide a sprayer container having a fill opening on the top side thereof which is enclosed by a lid fixed to a handle having a pair of outwardly projecting arms adapted to lockingly engage a pair of hold-down brackets upon rotation of the handle in one direction and to be disengaged from said brackets upon rotation of the handle in the other direction, and said handle being provided with an upwardly facing curved surface for coacting with a swingably mounted spring bail to provide a storage rack for the sprayer nozzle when the sprayer is not in use.

It is a still further object of this invention to provide a portable garden sprayer which is compact and rugged in construction, economical of manufacture, and efficient in use.

Other objects will appear hereinafter.

It is recognized that various modifications and changes may be made in the details of the structure illustrated without departing from the invention, and it is intended that the present disclosure shall be considered to be but the preferred embodiment.

Forming a part of this application is a drawing, in which:

Fig. 1 is an elevational view of a preferred embodiment of the invention;

Fig. 2 is a top plan view of the structure illustrated in Fig. 1;

Fig. 3 is an elevational sectional view of the structure illustrated in Fig. 2, taken along the line 3—3 thereof; and Fig. 4 is a perspective view of the sprayer container handle and the hold-down brackets for locking the handle in place on the container, with the various parts being separated to show their structural relationship.

Referring now to the drawings, wherein is shown a preferred embodiment of the invention, comprising a container having a front wall 7 which is curved to conform to the back of the operator, and a rear wall 8 which is curved at the ends thereof to be integrally joined to the curved ends of the front walls 7. The lower end of the container is enclosed by a bottom wall 9 which is suitably secured to the walls 7 and 8, and which is provided with a drain plug 10. The upper end of the container is enclosed by a top wall 11 which is secured to the side walls 7 and 8 in any suitable manner.

The container is provided with a back rest or bracket 12 which is curved to fit the back of the operator, as indicated by the numeral 13 in Fig. 2, and which is spaced from the front side wall 7, as indicated by the numeral 14. The back rest 12 is fixedly mounted on the container, by any suitable means, as by spot-welding, at the outer sides of the container, as at 15.

As shown in Fig. 3, the top wall 11 is provided with a centrally disposed fill opening 16 which is adapted to be closed by the lid or cover 17. The cover 17 is held in place by means of the handle 18 which is in turn secured in place by a pair of hold-down brackets 30. The handle 18 comprises a horizontal plate or strap 19 which is fixedly secured to the top of the cover 17, as by welding, and to the top of which is fixed a U-shaped member having outwardly extending arms 20 attached to the legs 21 of the U-shape, and a bight portion 22 which is concavely curved facing upwardly, as indicated by the numeral 23.

As shown in Figs. 1–3, the upwardly facing curved handle portion 23 is adapted to hold the sprayer nozzle 24, which is held in position thereon by a spring bail having a cam portion 25 provided with the arms 26 which are swingably mounted on the handle legs 21, as at 27. The sprayer nozzle 24 is provided with the usual hose 28 adapted for connection to the container by means of a suitable fitting as 29.

As is best seen in Fig. 2, the container is provided with a pair of hold-down brackets 30 which are spaced on either side of the fill opening 16, and which are attached to the container by suitable means, as by the rivets 31. The forward end of each of the brackets 30 is provided with an upwardly and outwardly extending portion to which is suitably attached a strap 33. The arms of the operator are projected through the straps 33 to hold the container on his back.

The brackets 30 are provided, at a central portion thereof, with an upwardly projected U-shaped part 34 which is provided with an opening or notch 35 on one end thereof. As best seen in Fig. 4, the parts 34 are notched on the opposite inner ends. It will be seen, that the handle arms 20 may be lockingly engaged with the U-shaped parts 34 by disposing the handle at an angle relative to the position shown in Fig. 2 with the right end thereof toward the front of the container, and then turning the handle in a clockwise direction to permit the handle arms 20 to slide into the notches 35 and onward into the parts 34.

The advantage and use of the back rest 12 will be seen when it is realized that the spray liquids in the container are normally very cool, relative to the temperature of the body of the operator, and that the space 14 between the container and the back rest functions as an insulator to prevent the operator from being chilled by contact with the cool container side wall 7.

It will be apparent that the container and the back rest 12 may be formed from any suitable lightweight metal and the like, as desired.

What I claim is:

1. In a portable garden sprayer of the class described, a storage container for a liquid insecticide; a spray nozzle connected to said container; a bracket fixed on the container which is curved to fit the back of a person carrying the sprayer; said bracket being spaced from the container to provide an insulating layer of air between the container and the back of said person; a pair of arm straps for securing the container to the back of said person; a fill opening in the top of said container; a cover for said opening; a handle fixed on said cover; a pair of fixed outwardly extending arms on said handle; a pair of laterally spaced apart retainer brackets mounted on the top of said container; a notch in one end of one of said retainer brackets, on the inner side thereof, and a similar notch in the other end of the other of said retainer brackets, on the inner side thereof, whereby said handle may be releasably locked in place on said container by engaging one of said arms in one of said notches and the other of said arms in the other of said notches and rotating the handle through said notches and into said retainer brackets; the upper part of said handle being concavely curved in an upwardly facing direction, and being adapted to have stored therein the spray nozzle; and a spring bail swingably mounted on said handle and adapted to engage the top of the spray nozzle and hold it in place on said handle.

2. In a portable garden sprayer of the class described, a storage container for a liquid insecticide; a spray nozzle connected to said container; a bracket fixed on the container which is curved to fit the back of a person carrying the sprayer; said bracket being spaced from the container to provide an insulating layer of air between the container and the back of said person; a pair of arm straps for securing the container to the back of said person; a fill opening in the top of said container; a cover for said opening; a handle fixed on said cover; a pair of fixed outwardly extending arms on said handle; a pair of laterally spaced apart retainer brackets mounted on the top of said container; and a notch in one end of one of said retainer brackets, on the inner side thereof, and a similar notch in the other end of the other of said retainer brackets, on the inner side thereof, whereby said handle may be releasably locked in place on said container by engaging one of said arms in one of said notches and the other of said arms in the other of said notches and rotating the handle through said notches and into said retainer brackets.

3. In a portable garden sprayer of the class described, a storage container for a liquid insecticide; a spray nozzle connected to said container; a fill opening in the top of said container; a cover for said opening; a handle fixed on said cover; a pair of fixed outwardly extending arms on said handle; a pair of laterally spaced apart retainer brackets mounted on the top of said container; and a notch in one end of one of said retainer brackets, on the inner side thereof and a similar notch in the other end of the other of said retainer brackets, on the inner side thereof, whereby said handle may be releasably locked in place on said container by engaging one of said arms in one of said notches and the other of said arms in the other of said notches and rotating the handle through said notches and into said retainer brackets.

4. In a portable garden sprayer of the class described, a storage container for a liquid insecticide; a spray nozzle connected to said container; a fill opening in the top of said container; a cover for said opening; a handle fixed on said cover; a pair of fixed outwardly extending arms on said handle; a pair of laterally spaced apart retainer brackets mounted on the top of said container; a notch in one end of one of said retainer brackets, on the inner side thereof, and a similar notch in the other end of the other of said retainer brackets, on the inner side thereof, whereby said handle may be releasably locked in place on said container by engaging one of said arms in one of said notches and the other of said arms in the other of said notches and rotating the handle through said notches and into said retainer brackets; the upper part of said handle being concavely curved, in an upwardly facing direction, and being adapted to have stored therein the spray nozzle; and a spring bail swingably mounted on said handle and adapted to engage the top of the spray nozzle and hold it in place on said handle.

5. In a portable garden sprayer of the class described, a storage container for a liquid insecticide; a spray nozzle connected to said container; a bracket fixed on the container and being curved to fit the back of a person carrying the sprayer; said bracket being spaced apart from the container to provide an insulating layer of air between the container and the back of said person; a fill opening in the top of said container; a cover for said opening; a handle fixed on said cover; a pair of fixed outwardly extended arms on said handle; a pair of laterally spaced apart retainer brackets mounted on the top of said container and on opposite sides of said opening, said brackets having outwardly extended ends thereon which protrude from one side of the container; an arm strap attached to each of said bracket extended ends for securing the container to the back of a person carrying the sprayer; an upraised portion on each of said brackets adjacent said fill opening; a notch in the inner side of each of said brackets adjacent said upraised portions; one of said notches being disposed adjacent the front end of one of the raised portions and the other of said notches being disposed adjacent the back end of the other of said raised portions, whereby said handle may be releasably locked in place on said container by engaging one of said arms in one of said notches and the other of said arms in the other of said notches and rotating the handle through said notches and into said raised portions on said retainer brackets; the upper end of said handle being concavely curved in an upwardly facing direction, and being adapted to have stored therein the spray nozzle; and, a spring bail swingably mounted on said handle and adapted to engage the top of the spray nozzle and to hold it in place on said handle.

References Cited in the file of this patent

UNITED STATES PATENTS

| | | |
|---|---|---|
| 1,869,869 | Smith | Aug. 2, 1932 |
| 2,192,256 | Brandt | Mar. 5, 1940 |
| 2,343,400 | Bullock | Mar. 7, 1944 |
| 2,350,184 | Oys | May 30, 1944 |
| 2,606,701 | Huthsing | Aug. 12, 1952 |